United States Patent [19]

Brown

[11] 4,433,625
[45] Feb. 28, 1984

[54] BLOW MOLDED DYNAMITE TUBE

[75] Inventor: Bobby L. Brown, Johnson County, Kans.

[73] Assignee: Mar-Kay Plastics, Inc., Kansas City, Mo.

[21] Appl. No.: 338,638

[22] Filed: Jan. 11, 1982

[51] Int. Cl.³ .............................................. F42D 3/00
[52] U.S. Cl. ................................. 102/331; 102/314; 102/316; 425/535
[58] Field of Search ............... 102/314, 316, 324, 331, 102/202.14, 275.12; 425/535, 536

[56] References Cited

U.S. PATENT DOCUMENTS

| | | | |
|---|---|---|---|
| 2,326,310 | 8/1943 | Johnson et al. | 102/314 |
| 2,687,092 | 8/1954 | Duesing | 102/314 |
| 3,861,851 | 1/1975 | Schiemann | 425/535 X |
| 4,000,696 | 1/1977 | Friant et al. | 102/331 |
| 4,092,389 | 5/1978 | Sakurai | 425/535 X |
| 4,098,189 | 7/1978 | Holm | 264/3 R X |
| 4,123,218 | 10/1978 | Krall | 425/535 |
| 4,178,852 | 12/1979 | Smith et al. | 102/275.4 |

FOREIGN PATENT DOCUMENTS

| | | | |
|---|---|---|---|
| 2031838 | 4/1980 | United Kingdom | 102/331 |
| 2,085,797 | 4/1982 | United Kingdom | 425/536 |
| 2092720 | 8/1982 | United Kingdom | 102/331 |

*Primary Examiner*—Peter A. Nelson
*Attorney, Agent, or Firm*—Kokjer, Kircher, Bradley, Wharton, Bowman & Johnson

[57] ABSTRACT

A molded plastic dynamite tube with an air ventillation hole is defined by a recess within the lower portion of the tube. The vent hole is formed by air pressure inside the tube during the molding process. The plastic blown out of the recess to define the vent hole and to form an extent co-planar with the side wall of the tube.

4 Claims, 4 Drawing Figures

BLOW MOLDED DYNAMITE TUBE

BACKGROUND AND SUMMARY OF THE INVENTION

This invention relates generally to dynamite tubes or cartridges of the type that is used in oil field sesmic exploration and more particularly to an improved method of blow molding such plastic tubes and the improvement which results therefrom.

The improved tube has an air vent hole adjacent to or near the lower, closed portion thereof. The consistency of the dynamite used in conjunction with a cartridge is of the type that is similar to pie dough which can, and sometimes will, crumble or create air pockets as it is being packed. This hole, and its size and shape, permits the air inside the tube to be removed during the packing process.

Known prior art manufacturing techniques use a pneumatic piston and an associated needle to puncture a hole in the plastic tube. The pneumatic piston-needle combination requires more maintenance than does the present invention, arising from the requirement of an additional number of individual parts and the maintenance thereon, e.g., needle breakage, down time and labor costs in servicing of the equipment. Finally, the vent hole formed in the cartridge by known puncturing methods is irregular and often an incomplete penetration.

The vent hole of the subject invention is formed by air pressure created within the tube during the blow molding process. A unique nozzle and relay controlled valving arrangement permits the mold to effect the forming of the vent hold during the blow molding process without any "slowdown" or adverse effect on the remainder of the tube.

The present invention is directed to the above problems and, in doing do, produces a more efficient method of forming the cartridge along with an improved product as a result of the part forming method.

One object of the present invention is to eliminate entirely the need of a pneumatic hole puncher. Not only will the maintenance cost then be reduced, but also the initial production costs for the product.

Another object is to provide a unique method of forming the vent hole in a dynamite tube, wherein the use of a hole forming air pressure leaves both the interior and exterior of the cartridge smooth and snag free.

A further object of the invention is to produce a safer dynamite cartridge with lesser production costs than heretofor known. The unique manufacturing process permits the vent hole to be blown out by the air pressure (during the forming of the part) thereby forming an extent located within a recess on the outside of the tube. However, the inner tube surface remains rounded and smooth thus easily accomodating the dynamite during filling without creating "air pockets". Further, the exterior recess prevents this extent from protruding further than the side wall of the tube.

An additional object is to provide a unique method of constructing dynamite tubes with vent holes which, by the nature of the manufacturing process, will not become clogged by its own residue.

Other and further objects of the invention, together with the features of novelty appurtenant thereto, will appear in the course of the following description.

DETAILED DESCRIPTION OF THE INVENTION

In the accompanying drawings which form a part of the specification and are to be read in conjunction therewith and in which like reference numerals are used to indicate like parts in the various views.

Figure 1:
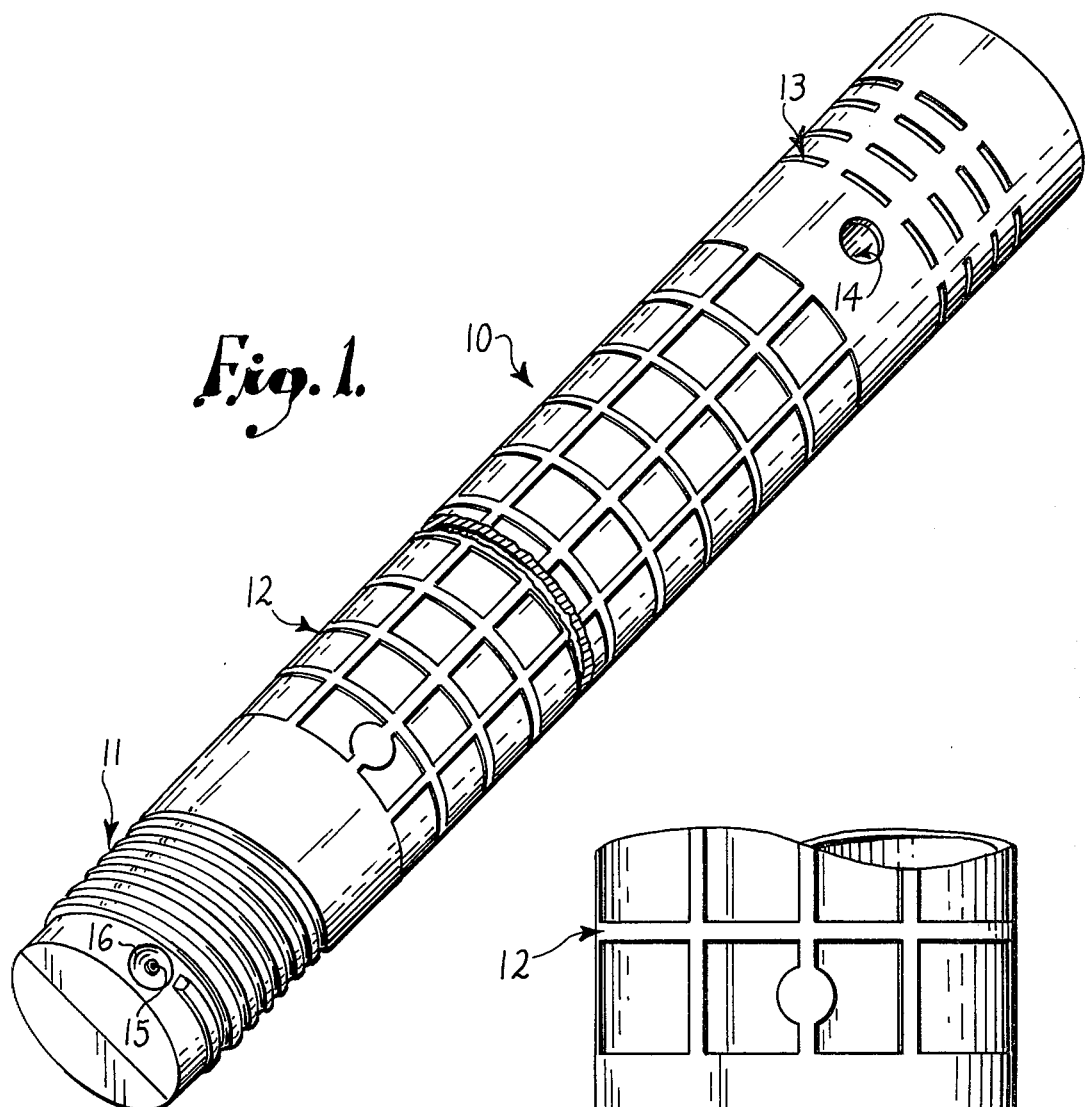
FIG. 1 is a perspective view of a typical plastic dynamite tube, same being shown as broken in half and of an indeterminate length with the vent hole on the lower left surface.
Figure 2:
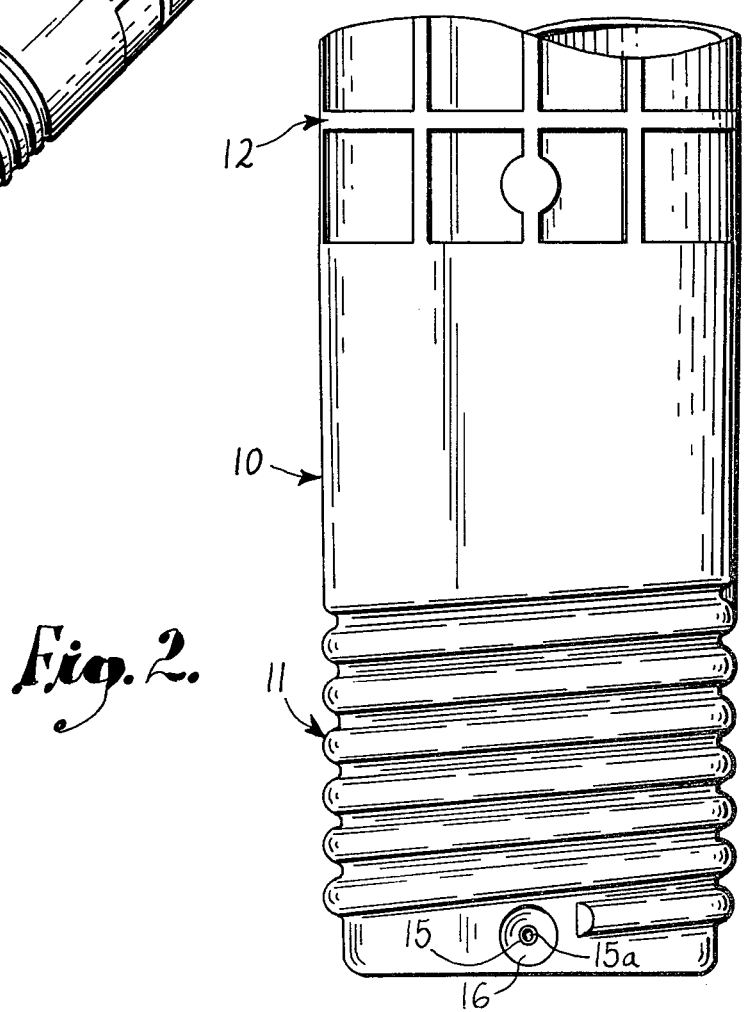
FIG. 2 is an enlarged view of the lower left end portion of the tube shown in FIG. 1.

Referring now to the drawings and more particularly to FIGS. 1 and 2, reference numeral 10 represents the completed part, e.g., the dynamite tube. Tube 10 is externally threaded at 11 and includes rectangular reinforcing type corrugations along most of the length thereof. The upper tube end is internally threaded at 13. A cut-out 14 permits wiring to be internally directed to the dynamite itself. Finally, the blow-out extent, described in more detail later, is shown by the numeral 15 as being located within the dimpled recess 16.

Figure 3:
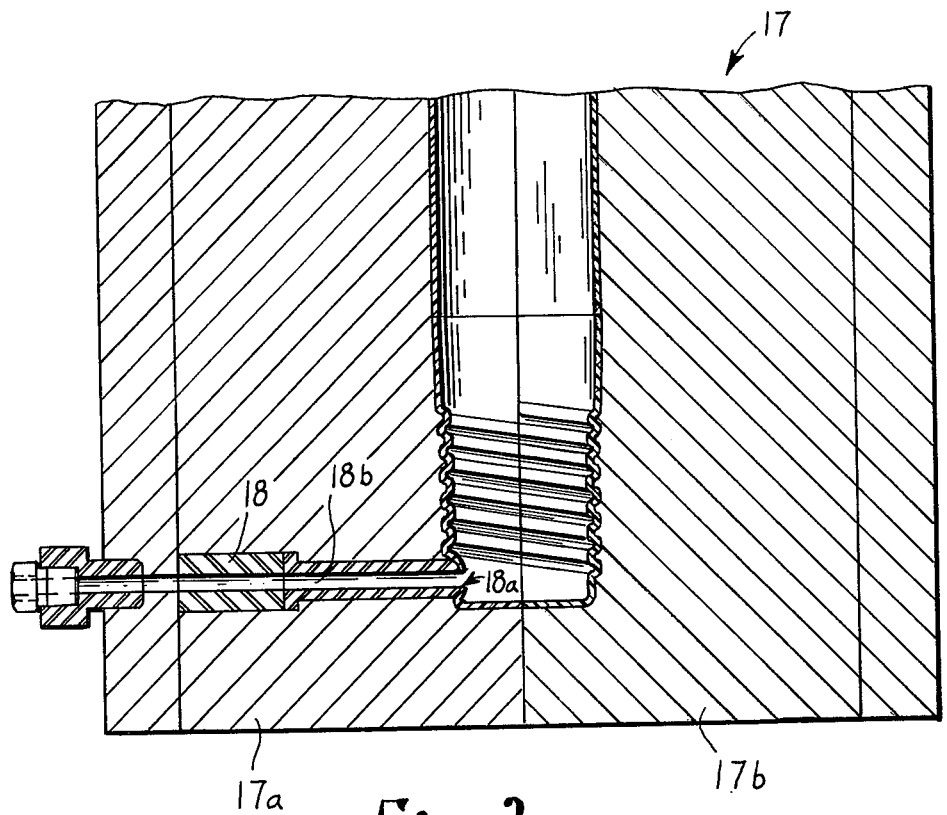
FIG. 3 is a sectional view of the lower end of the mold and associated "blow-out" nozzle.
Figure 4:
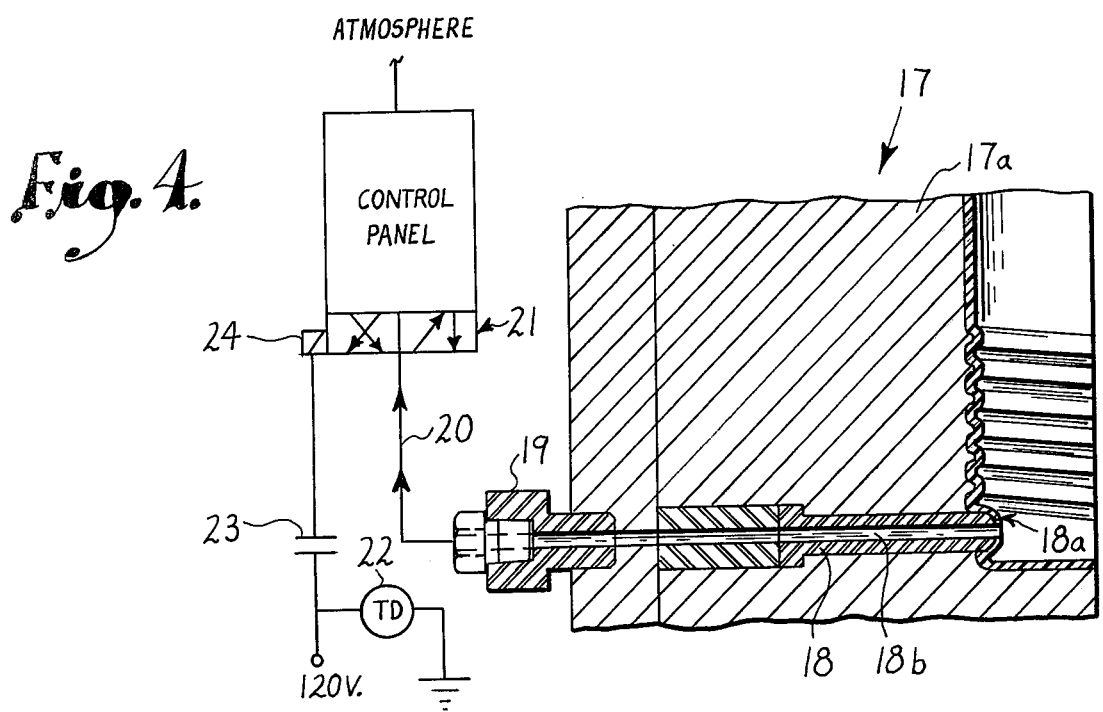
FIG. 4 is a combined sectional view of the mold (similar to FIG. 3) and a schematic diagram of the relay and valving circuit for the process control.

The mold 17 used in the subject process is shown in FIGS. 3 and 4. As is conventional, mold 17 is divided into two halves, 17a and 17b, which conventionally operate to pneumatically separate to accept the hollow plastic, closed during the actual molding, and then again open for the part removal. Suitable heating and cooling conduits within the mold permit the mold halves 17a and 17b to be alternately heated and cooled during the molding process.

As suggested above, the plastic material is processed in a conventional manner and enters the upper mold in a hollow semi-molten state with mold halves 17a and 17b separated. The halves then close on the plastic and compressed air is introduced under sufficient pressure to force the plastic firmly against the now closed mold wall.

As shown in FIGS. 3 and 4, an air blow-out nozzle 18 is located near the bottom of mold 17 in half 17a. The inner end portion of nozzle 18 is rounded convexly at 18a with a center bore 18b extending the length thereof. It should be noted that the inner end 18a is actually located interiorly of the inner surface of mold 17 so as to create the dimpled recess 16, mentioned above, in the molded part.

The air pressure within the mold cavity (17) deforms the plastic to the shape thereof including the blow-out nozzle 18 and its associated center bore 18b. The pressure build up continues until the plastic which is "blown out" of cavity in mold 17 and in bore 18b ruptures, thereby forming the above mentioned extent 15 (with its vent hole 15a) on the exterior surface of the dimpled recess 16 (see FIGS. 1 and 2). The diameter of the blow-out nozzle bore 18b must be larger than the desired finished diameter of vent hole 15a. Finally, the rounded or domed inner surface of dimpled recess 16 is shaped to insure smoother lines within tube 10.

Referring now more particularly to FIG. 4, nozzle 18 is connected to a special hose adaptor 19 located on the exterior of the mold half 17a with its center bore 19a being in communicating relationship with the nozzle 18 and its associated center bore 18b. Hose 20 is schematically shown in FIG. 4 as being connected to one end to hose adaptor 19 and at the other end through a 4-way valve 21 so that it may be open to atmosphere depending on the valve position. In actual practice it is sometimes convenient to plug certain ports of the 4-way valve to effectuate a 3-way operation. In any event, the 4-way valve 21 is controlled by a variable time delay relay 22 which is interconnected through the normally open relay 23 to the solenoid 24 which, depending on its energized state, moves the valve to its desired position. In this manner, when a blow-out occurs (e.g., when the air pressure within the mold 17 forces the extent 15 and vent hold 15a to form) time delay relay 22 will cause the relay contacts 23 to close thereby energizing solenoid 24 and closing the value 21. When valve 21 closes the blow-out, nozzle 18 is no longer open to atmosphere and pressure within the mold cavity (mold 17) can continue to increase in order to complete the forming of the part.

It has been found that the relay and its associated time delay operates most efficiently if the valve is closed within approximately 4 seconds after "blow-out". This timing arrangement can be empircally calcuated depending on such things as the type of plastic used and the tube wall thickness desired. After the part is cooled, the mold is opened, the part removed and the operation repeated with the 4-way valve 21 again being opened to atmosphere. As suggested, it may be desirable to vary the closing time of the 4-way valve by plus or minus two seconds depending upon the desired tube wall thickness.

It can be seen that from a practical standpoint the extent 15 will extend no further than the side wall of the plastic tube 10. This is partly due to the dimensions of the inner end of the blow-out nozzle 18 and to the timing associated with valve 21. In other words, actual blow-out will occur for a sufficient period fo time to form the extent to a desired thickness and to insure that the vent hole 15a located therein will have free air passage for its intended use when it is packed with the doughy dynamite. Further more, the extent (15) will not extend beyond the side wall of the tube thereby eliminating the possibility of snags or hangups during actual use or when it is being handled or filled with explosives.

The preferred location for the dimpled recess 16 in the associated extent is between the threads and the closed end portion at the lower end of the tube 10. Obviously the extent and recess can be located at other positions on the side wall of tube 10 and from time-to-time it may be preferable to locate same slightly above threads 11 rather than below same.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

I claim:

1. In a molded plastic dynamite tube having a cylindrical side wall, the upper portion thereof being an open end and the lower portion thereof being a closed end, the improvement comprising:
   a dimpled recess in said tube adjacent the lower closed end thereof, and
   a vent hole defined by said recess providing fluid communication between the inside of said tube and the outside of said tube.

2. The combination as in claim 1 wherein said recess is dome-shaped.

3. The combination as in claim 1 wherein said tube includes an externally threaded portion located adjacent said recess.

4. A molded plastic dynamite tube comprising:
   a cylindrical side wall, said side wall having an upper portion with an open end and a lower portion with a closed end;
   a thread portion in the side wall of said tube adjacent said closed end;
   a recess in said tube located in the lower portion thereof; and
   a vent hole defined by said recess providing fluid communication between the inside of said tube and the outside of said tube, said vent hole having an extent on the outside of said tube, the outer end of said extent being substantially co-planar with the exterior of said cylindrical side wall.

* * * * *